United States Patent
Lee et al.

(10) Patent No.: US 10,713,848 B2
(45) Date of Patent: Jul. 14, 2020

(54) SYSTEM AND METHOD FOR PROVIDING SIMULATED ENVIRONMENT

(71) Applicant: HTC Corporation, Taoyuan (TW)

(72) Inventors: Hsin-Hao Lee, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 105 days.

(21) Appl. No.: 15/842,832

(22) Filed: Dec. 14, 2017

(65) Prior Publication Data

US 2018/0293800 A1 Oct. 11, 2018

Related U.S. Application Data

(60) Provisional application No. 62/482,207, filed on Apr. 6, 2017.

(51) Int. Cl.
| | |
|---|---|
| *A63F 13/25* | (2014.01) |
| *A63F 13/34* | (2014.01) |
| *A63F 13/213* | (2014.01) |
| *G06T 19/00* | (2011.01) |
| *G06F 3/14* | (2006.01) |
| *G06F 3/01* | (2006.01) |

(52) U.S. Cl.
CPC ............ *G06T 19/006* (2013.01); *G06F 3/011* (2013.01); *G06F 3/14* (2013.01)

(58) Field of Classification Search
CPC .......................... G02B 27/0172; G02B 27/017
See application file for complete search history.

(56) References Cited

U.S. PATENT DOCUMENTS

| | | | | |
|---|---|---|---|---|
| 2012/0188269 | A1* | 7/2012 | Uyama | G06F 3/041 |
| | | | | 345/619 |
| 2012/0249741 | A1* | 10/2012 | Maciocci | G06F 3/011 |
| | | | | 348/46 |
| 2013/0328928 | A1* | 12/2013 | Yamagishi | G02B 27/017 |
| | | | | 345/633 |
| 2014/0368534 | A1* | 12/2014 | Salter | G06T 19/006 |
| | | | | 345/619 |
| 2015/0094142 | A1 | 4/2015 | Stafford | |
| 2016/0282618 | A1 | 9/2016 | Kon et al. | |
| 2017/0219822 | A1 | 8/2017 | Usami | |

(Continued)

FOREIGN PATENT DOCUMENTS

| | | |
|---|---|---|
| CN | 103460256 A | 12/2013 |
| CN | 103480154 A | 1/2014 |

(Continued)

OTHER PUBLICATIONS

Corresponding Taiwan office action dated Nov. 20, 2018.

(Continued)

*Primary Examiner* — Nan-Ying Yang
(74) *Attorney, Agent, or Firm* — CKC & Partners Co., LLC

(57) ABSTRACT

Present disclosure relates to a system for providing a simulated environment and a method thereof. The system comprises a first wearable device and a computing unit. The first wearable device is configured to output a first scenario of the simulated environment. The computing unit is configured to provide an indication corresponding to a mobile object in the first scenario when the mobile object is detectable in a predetermined distance distanced from the first wearable device.

14 Claims, 6 Drawing Sheets

(56) References Cited

U.S. PATENT DOCUMENTS

2017/0232335 A1* 8/2017 Williams .............. A63F 13/235
  463/31
2017/0282062 A1* 10/2017 Black ..................... H04L 67/38

FOREIGN PATENT DOCUMENTS

| | | |
|---|---|---|
| CN | 105204625 A | 12/2015 |
| CN | 105452994 A | 3/2016 |
| CN | 105474302 A | 4/2016 |
| CN | 106295581 A | 1/2017 |
| CN | 106383596 A | 2/2017 |
| CN | 106384374 A | 2/2017 |
| TW | 201633252 A | 9/2016 |

OTHER PUBLICATIONS

Corresponding extended European search report dated Jul. 12, 2018.
Corresponding Chinese office action dated Jul. 17, 2019.

\* cited by examiner

SYSTEM AND METHOD FOR PROVIDING SIMULATED ENVIRONMENT

CROSS-REFERENCE TO RELATED APPLICATION

This application claims priority to U.S. Provisional Application Ser. No. 62/482,207, filed on Apr. 6, 2017, which is herein incorporated by reference.

BACKGROUND

Field of Invention

Present disclosure relates to a system and a method for providing a simulated environment. More particularly, the present disclosure relates to the system and the method for providing simulated environment.

Description of Related Art

Virtual reality technology is an ideal way for demonstrating highly realistic objects to users, especially to those cannot be satisfied only with 2D pictures or videos. Due to the effort of engineers, nowadays, objects displayed in virtual reality world are convincing that users sometimes describe them as almost touchable. Actually, the virtual reality image displayed to a user is continuously refreshed in a very fast speed according to his/her action. The unrestful process of refreshment is the reason why users can be immersive in the virtual reality environment by acting the same in the real world.

Furthermore, virtual reality environment is more powerful when being applied to a group of people. By sharing the same virtual space, a group of users can have observations and discussions on a common ground, which definitely makes demonstration or co-working much easier. However, there are still some unsolved problems for providing a virtual reality environment to multiple users, such as system burden or power consumption.

SUMMARY

The disclosure relates to a system for providing a simulated environment. The system comprises a first wearable device and a computing unit. The first wearable device is configured to output a first scenario of the simulated environment. The computing unit is configured to provide an indication corresponding to an object in the first scenario when the object is detectable in a predetermined distance distanced from the first wearable device.

Another aspect of present disclosure is to provide a method for providing a simulated environment. The method comprises following steps: outputting, by a first wearable device, a first scenario of the simulated environment; and providing, by a computing unit, an indication corresponding to an object in the first scenario when the object is detectable in a predetermined distance distanced from the first wearable device.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Figure 1:
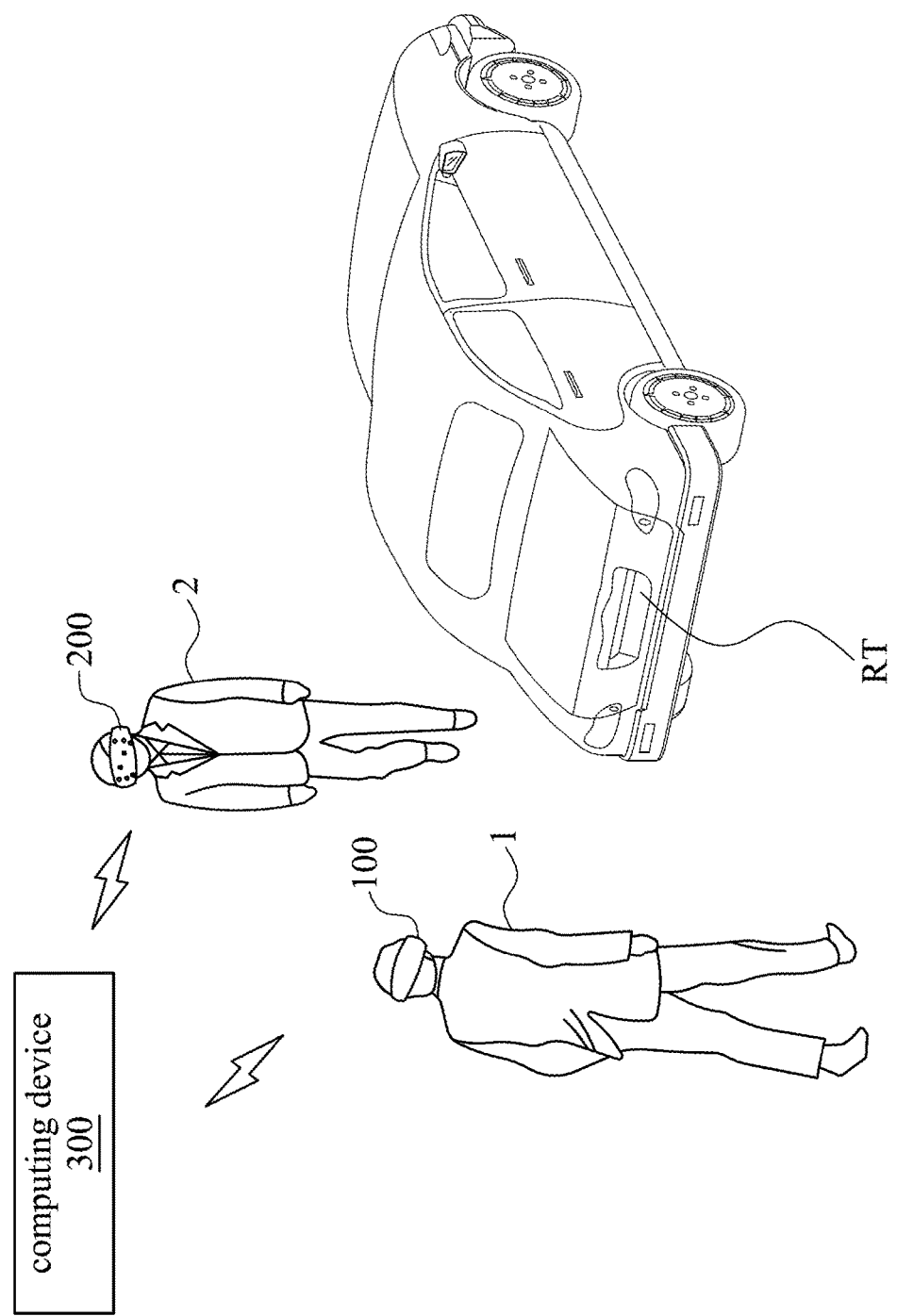
FIG. 1 is a schematic diagram for showing the backgrounds of an embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram for showing the backgrounds of an embodiment of present disclosure. As shown in FIG. 1, in the embodiment, a virtual reality demonstration is provided in an exhibition room. User 1 and user 2 are the participants of the virtual reality demonstration. Since the demonstration is regarding to a new car, therefore a virtual roadster RT would be illustrated in a simulated environment. The simulated environment mentioned here is constructed by one or several computing units to generate realistic images, sounds and other sensations that simulate the user's physical presence in the simulated environment. For example, the simulated environment can be a virtual reality (VR) space, augmented reality (AR) space or mixed reality (MR) space. In this case, it is a virtual reality space. The virtual roadster RT illustrated in FIG. 1 is merely an indication for showing the position of the virtual roadster RT in the simulated environment, the virtual roadster RT is not perceivable until user 1 and user 2 wears corresponding gears. During the virtual reality demonstration, user 1 may carry a first gear 100 and the user 2 may carry a second gear 200, wherein the first gear 100 and the second gear 200 are both HMDs (Head-Mounted Displays). The first gear 100 and the second gear 200 are in communication with a computing unit 300, wherein the computing unit 300 is configured to provide the simulated environment. The first gear 100 is configured to output a first scenario of the simulated environment to user 1. The first scenario being output shows a partial view of the virtual reality space corresponding to the viewpoint of the first gear 100. The second gear 200 is configured to output a second scenario of the simulated environment to user 2. The second scenario being output shows another partial view of the virtual reality space corresponding to the viewpoint of the second gear 200. Part of the virtual roadster RT may be provided in the first scenario depending on the position of user 1 with respect to the exhibition room. In the same manner, part of the virtual roadster RT may be provided in the second scenario depends on the position of user 2 with respect to the exhibition room.

In some configurations of the embodiment, the first gear 100 may track a first position corresponding to user 1 and send the first position to the computing unit 300. The second gear 200 may track a second position corresponding to user 2 and send the second position to the computing unit 300. The first position and the second position are provided to generate the coordinates corresponding to user 1 and user 2 in the simulated environment respectively.

In some other configurations of the embodiment, only the first gear 100 may track a first position corresponding to user 1 and a second position corresponding to user 2. The first gear 100 may send the first position and the second position to the computing unit 300. The first position and the second position are provided to generate the coordinates corresponding to user 1 and user 2 in the simulated environment respectively.

In some other configurations of the embodiment, an individual detector (not shown in figure) may be configured to track a first position corresponding to user 1 and a second position corresponding to user 2. The individual detector may send the first position and the second position to the computing unit 300. The first position and the second position are provided to generate the coordinates corresponding to user 1 and user 2 in the simulated environment respectively.

In aforementioned embodiments, since the exhibition room is a limited space, it highly possible that user 1 and user 2 would bump into each other if they were focus on the virtual roadster RT. A straightforward approach to solve aforementioned problem is to make all the users visible in the simulated environment. If the users of the simulated environment may see each other, it would be less likely to have collisions with other users in the exhibition room. Moreover, it would be convenient to have interactions with the others if they can be seen in the simulated environment. However, the approach of keeping all the users visible in the simulated environment according to the perspective of users necessitates high rate frame refreshments, which is no doubt a heavy burden to the system for providing the simulated environment. Therefore, present disclosure provides a proper resolution.

However, it should be noted, the computing unit 300 illustrated in FIG. 1 is only an example. In some embodiments, the computing unit 300 may be a CPU, GPU, or some control unit configured in the first gear 100 or the second gear 200. Depends on which gear is configured with the computing unit 300, the first position corresponding to user 1 and the second position corresponding to user 2 will be sent to that gear and being processed by the computing unit 300.

Figure 2A:
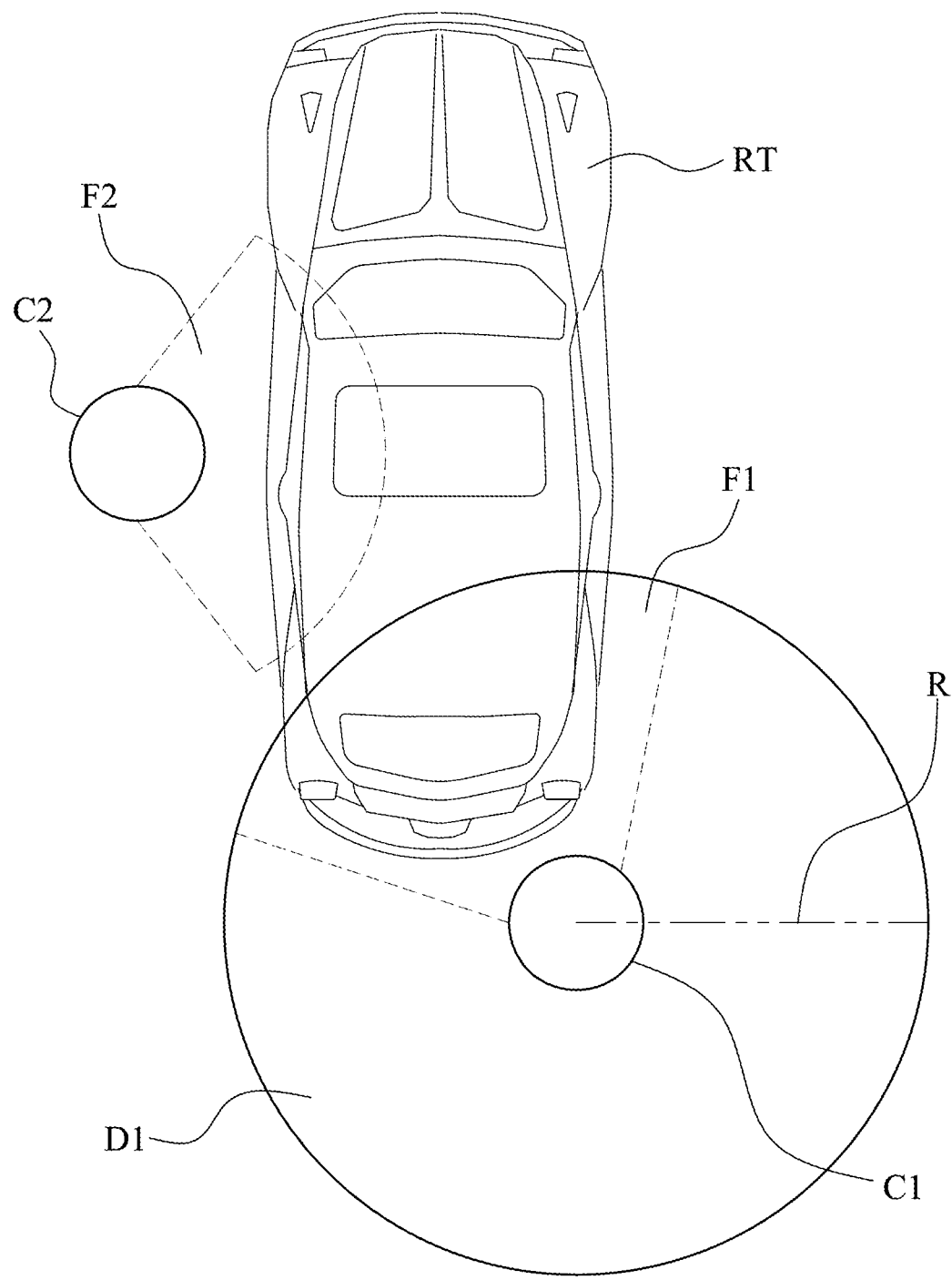
FIG. 2A is a schematic diagram of a system for providing a simulated environment according to some embodiments of present disclosure.

FIG. 2A is a schematic diagram of a system for providing a simulated environment according to some embodiments of present disclosure. The figure illustrates an above view of a simulated environment. As shown in FIG. 1, in the embodiment, a virtual roadster RT is provided in the center of the simulated environment. When user 1 is carrying the first gear 100, a first coordinate C1 corresponding to user 1 may be provided to the simulated environment. The first coordinate C1 is located at the rear right of the virtual roadster RT. A first field of view F1 extended from the first coordinate C1 is illustrated in the figure, wherein the first field of view F1 indicates a range that user 1 may observe in the simulated environment. In the same manner, when user 2 is carrying the second gear 200, a second coordinate C2 corresponding to user 2 may be provided to the simulated environment. The second coordinate C2 is located at the left lateral of the virtual roadster RT. A second field of view F2 extended from the second coordinate C2 is illustrated in the figure to indicate a range that user 2 may observe in the simulated environment.

In the embodiment, user 1 is being provided with a radar range D1. The radar range D1 is a circle area with a radius R centered by the first coordinate C1. Since the first coordinate C1 is determined by the position of user 1 carrying the first gear 100, it can be say that the radar range is centered by the first gear 100 as well. In the simulated environment, mobile objects are not observable to user 1 unless they are detectable in the radar range D1.

Figure 2B:
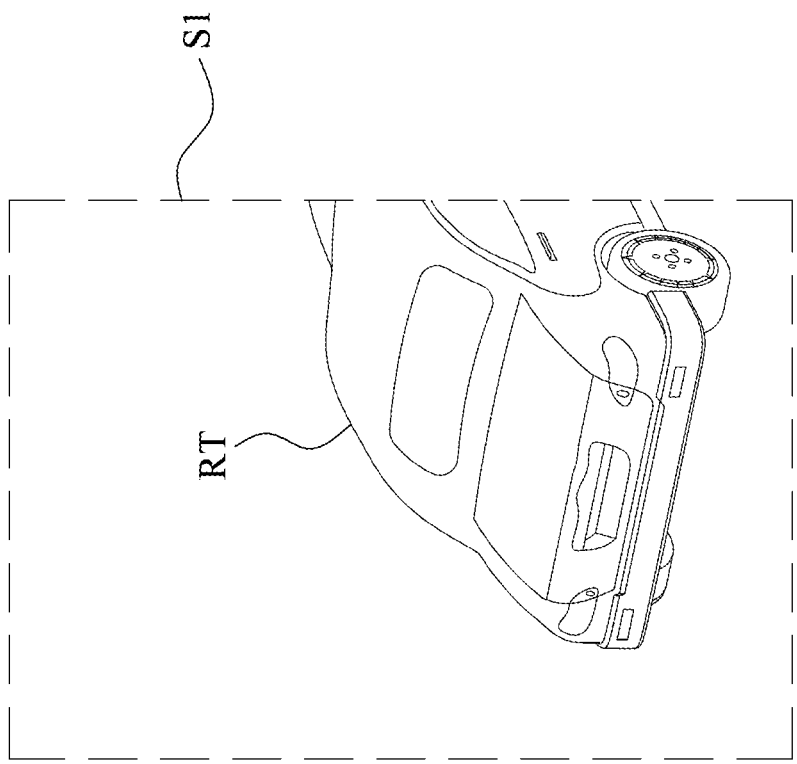
FIG. 2B is a schematic diagram of a system for providing a simulated environment according to the embodiment of FIG. 2A.

FIG. 2B is a schematic diagram of a system for providing a simulated environment according to the embodiment of FIG. 2A. A first scenario S1 is illustrated in FIG. 2B. As shown in FIG. 1, via the first gear 100, user 1 may observe the first scenario S1 provided by computing unit 300. The first scenario S1 is an illustration of the scenario being covered by the first field of view F1 in the simulated environment. As shown in FIG. 2B, in the first scenario S1, part of the tail of the virtual roadster RT is observable to user 1. Since user 2, which is also regard as a mobile object, is not detectable in the radar range D1, the existence of user 2 is insensible in the first scenario S1.

Figure 3A:
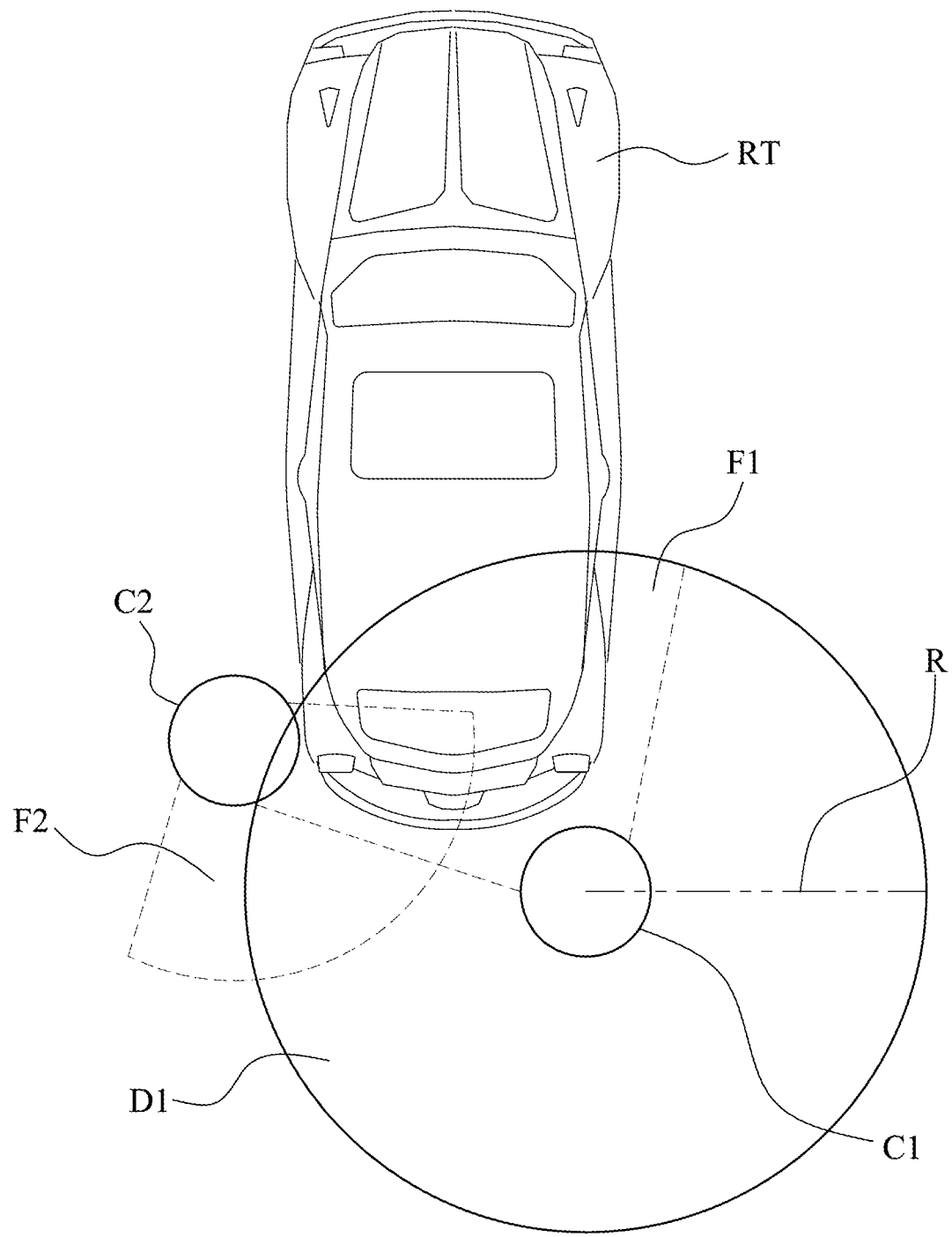
FIG. 3A is a schematic diagram of a system for providing a simulated environment according to some embodiments of present disclosure.

FIG. 3A is a schematic diagram of a system for providing a simulated environment according to some embodiments of present disclosure. The figure illustrates an above view of a simulated environment. As shown in both FIG. 1 and FIG. 3A, in the embodiment, when user 1 is carrying the first gear 100, a first coordinate C1 corresponding to user 1 may be provided to the simulated environment. A first field of view F1 extended from the first coordinate C1 is illustrated in the figure, wherein the first field of view F1 indicates a range that user 1 may observe via the first gear 100 in the simulated environment. In the same manner, when user 2 is carrying the second gear 200, a second coordinate C2 corresponding to user 2 may be provided to the simulated environment. A second field of view F2 extended from the second coordinate C2 is illustrated in the figure to indicate a range that user 2 may observe in the simulated environment. The virtual roadster RT is provided in the center of the simulated environment. The first coordinate C1 is located at the rear right of the virtual roadster RT. The second coordinate C2 is located around rear left of the virtual roadster RT. The second coordinate C2 is located within the first field of view F1.

In the embodiment, user 1 is being provided with a radar range D1. The radar range D1 is a circle area with a radius R centered by the first coordinate C1. Since the first coordinate C1 is determined by the position of user 1 carrying the first gear 100, it can be say that the radar range D1 is centered by the first gear 100 as well. In the simulated environment, mobile objects are not observable to user 1 unless they are detectable in the radar range D1. When user 2, as a mobile object, is moving toward user 1 and being detected in a distance shorter than the radius R from the first gear 100, the computing unit 300 may provide an indication corresponding to user 2 in the simulated environment. As such, user 1 may see the presence of user 2, which may reduce the chance for the users to have collisions.

In the embodiment, the radius R is determined according to height, length of arm, length of feet or step length measured from user 1. For example, for a person who has longer arms, a larger radius would be more likely to reduce the chance for having limb collisions than smaller ones.

Figure 3B:
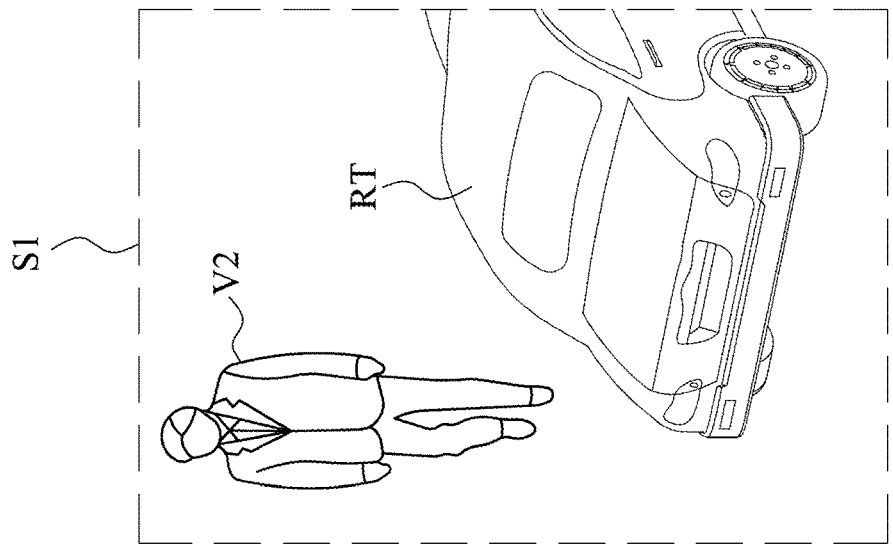
FIG. 3B is a schematic diagram of a system for providing a simulated environment according to the embodiment of FIG. 3A.

FIG. 3B is a schematic diagram of a system for providing a simulated environment according to the embodiment of FIG. 3A. A first scenario S1 is illustrated in FIG. 3B. As shown in both FIG. 1 and FIG. 3, via the first gear 100, user 1 may observe the first scenario S1 provided by the computing unit 300. The first scenario S1 is an illustration of the scenario being covered by the first field of view F1 in the simulated environment. In the first scenario S1, part of the tail of the virtual roadster RT is observable to user 1. Since user 2, as a mobile object, is moving toward user 1 and being detected in the radar range D1 centered by the first gear 100, an avatar V2 corresponding to user 2 is illustrated next to the virtual roadster RT in the first scenario S1. The avatar V2 may be provided with the appearance and outfits corresponding to user 2. The avatar V2 may move according to the movement of user 2. As such, user 1 may observe the relative distance between him and user 2. Even though user 2 is concentrating on the virtual roadster RT, user 1 may have a chance to walk past him in advance. In some embodiments, when user 2 is no longer detectable in the radar range D1, the computing unit 300 stops to illustrate the avatar V2 in the first scenario S1, which may save more powers and further reduce system loadings.

Figure 4:
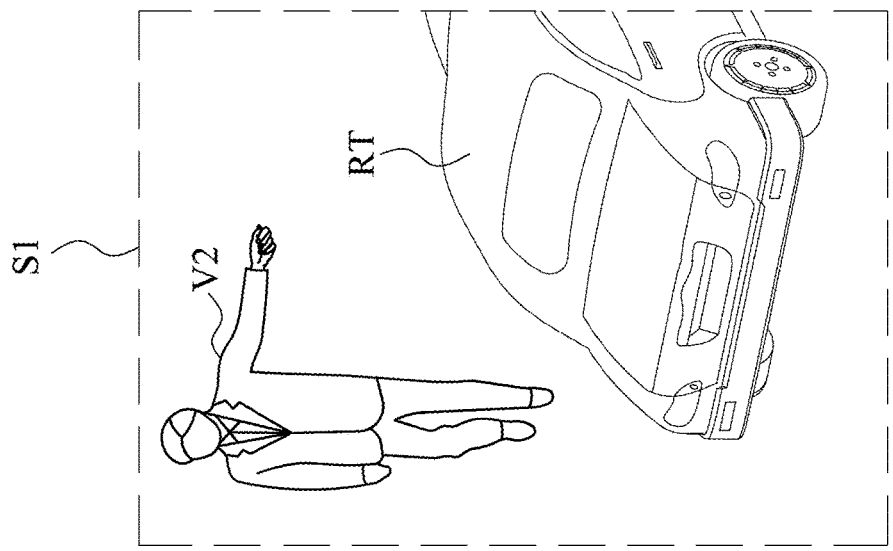
FIG. 4 is a schematic diagram of a system for providing a simulated environment according to some embodiments of present disclosure.

FIG. 4 is a schematic diagram of a system for providing a simulated environment according to some embodiments of present disclosure. As shown in FIG. 3A and FIG. 3B, present disclosure provides user 1 a radar range D1, only the mobile objects covered by the radar range D1 is observable to user 1. Through this approach, system burden and power consumption of the computing unit 300 may be reduced. Nevertheless, if the computing unit 300 was configured to illustrate any motion made by user 2 in simulated environment, the computing unit 300 will be repeatedly refreshing the image of the avatar V2 as long as user 2 is detectable in the radar range D1. According to FIG. 3A and FIG. 3B, an approach is provided by present disclosure to further reduce system burden and power consumption. In some embodiments, the computing unit 300 is further configured only to refresh the avatar V2 corresponding to a motion of the second user 2 in the first scenario S1 when the motion is being detected as exceeding a motion threshold. The motion threshold is determined according to height, length of arm, length of feet or step length of user 2. As shown in FIG. 4, when user 2 raises his hand, the motion is being detected as exceeding the motion threshold and will be presented on the avatar V2 in the first scenario S1. In this manner, user 1 may observe major motions made by user 2 but minor motions, such as eye blinks, will be filtered. Moreover, in some embodiments, the computing unit 300 is further configured to reduce a refresh rate (in fps) for refreshing the avatar V2 corresponding to the motion when the motion is being detected as lower than the motion threshold. Through these approaches, system burden and power consumption of the computing unit 300 may be reduced further.

Figure 5:
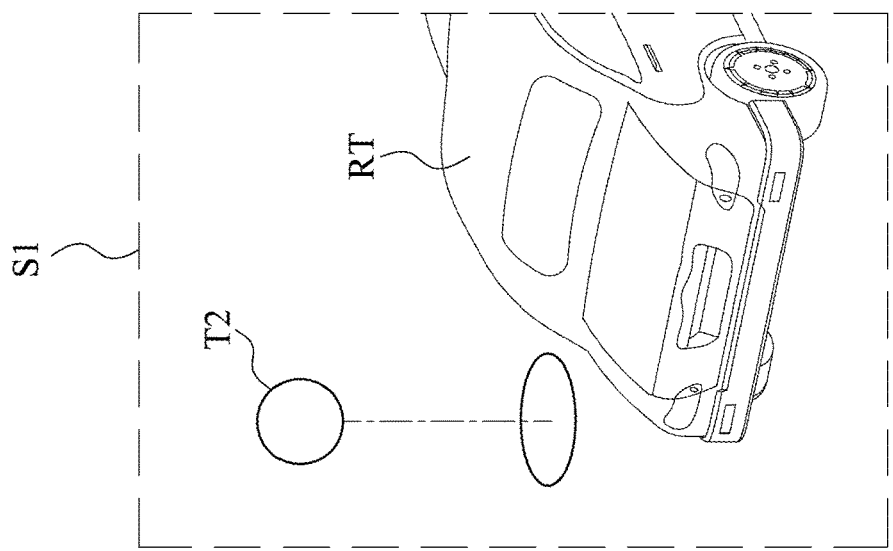
FIG. 5 is a schematic diagram of a system for providing a simulated environment according to some embodiments of present disclosure.

FIG. 5 is a schematic diagram of a system for providing a simulated environment according to some embodiments of present disclosure. As shown in FIG. 3A and FIG. 3B, present disclosure provides user 1 a radar range D1, only the mobile objects covered by the radar range D1 is observable as avatars to user 1. However, present disclosure further provides some alternatives to illustrate the presence of users covered by the radar range D1. As shown in FIG. 5, if user 2, as a mobile object, is being detected in the radar range D1, a token T2 corresponding to user 2 may be presented in the first scenario S1. The token T2 may move according to the movement of user 2. As such, user 1 may observe the relative distance between him and user 2. In some embodiments, the presence of the token T2 may be presented in the first scenario S1 with some notification audios. The notification audios are provided as precautions in case user 1 ignores the presence of the token T2.

Figure 6:
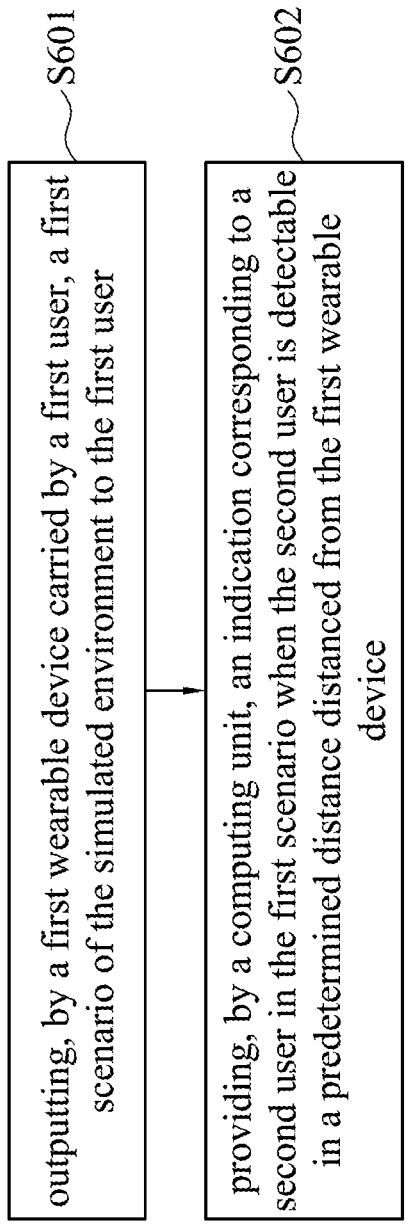
FIG. 6 is a flow chart of a method for providing a simulated environment according to some embodiments of present disclosure.

FIG. 6 is a flow chart of a method for providing a simulated environment according to some embodiments of present disclosure. The steps of the method will be listed and explained in detail in following segments.

Step S601: outputting, by a first wearable device, a first scenario of the simulated environment. As shown in FIG. 1, FIG. 2A, FIG. 2B, FIG. 3A, FIG. 3B, FIG. 4 and FIG. 5, the first gear 100 is configured to associate with the computing unit 300 for displaying the first scenario S1 of the simulated environment to user 1, wherein the first coordinate C1 is assigned to user 1 in the simulated environment.

Step S602: providing, by a computing unit, an indication corresponding to a mobile object in the first scenario when the mobile object is detectable in a predetermined distance distanced from the first wearable device. As shown in FIG. 1, FIG. 2A, FIG. 2B, FIG. 3A, FIG. 3B, FIG. 4 and FIG. 5, the first gear 100 is configured to associate with the computing unit 300 for displaying the first scenario S1 of the simulated environment to user 1. The avatar V2 or the token T2 corresponding to user 2 may be illustrated in the first scenario S1 only when user 2, as a mobile object, is detectable within the radar range D1. In some embodiments, when user 2 is no longer detectable in the radar range D1, the computing unit 300 stops to illustrate the avatar V2 or the token T2 in the first scenario S1. In some embodiments, the computing unit 300 is further configured only to refresh the avatar V2 or the token T2 corresponding to a motion of the second user 2 in the first scenario S1 when the motion is being detected as exceeding a motion threshold. Through these approaches, present disclosure provides ideal resolutions to reduce system loadings and power consumption for providing simulated environments to multiple users.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system for providing a simulated environment, comprising:
    a processor;
    a first wearable device comprising a display, configured to output a first scenario of the simulated environment provided by the processor for a first user; and
    a second wearable device comprising a display, configured to output a second scenario of the simulated environment provided by the processor for a second user;
    wherein when a second coordinate of the second user in the simulated environment is detectable in a predetermined distance distanced from a first coordinate of the first user in the simulated environment, the processor provides an indication corresponding to the second user in the first scenario, and refresh the indication according to a motion of the second user in the first scenario,
    wherein the indication is an avatar corresponding to the second user, and
    wherein the processor is further configured to refresh the avatar corresponding to the motion of the second user in the first scenario when the motion is being detected exceeding a motion threshold, and the processor is further configured to reduce a refresh rate for refreshing the avatar corresponding to the motion when the motion is being detected lowering the motion threshold.

2. The system of claim 1, wherein the processor stops to illustrate the avatar in the first scenario when the second coordinate of the second user in the simulated environment is no longer detectable in the predetermined distance distanced from the first coordinate of the first user in the simulated environment.

3. The system of claim 1, wherein the processor stops to refresh the avatar in the first scenario when the second coordinate of the second user in the simulated environment is no longer detectable in the predetermined distance distanced from the first coordinate of the first user in the simulated environment.

4. The system of claim 1, wherein the motion threshold is determined according to height, length of arm, length of feet or step length of the second user.

5. The system of claim 1, wherein the predetermined distance is determined according to height, length of arm, length of feet or step length measured from a user who carries the first wearable device.

6. The system of claim 1, wherein the indication is a token corresponding to the second user.

7. The system of claim 1, wherein a distance between the second coordinate of the second user in the simulated environment and the first coordinate of the first user in the simulated environment is detected by the second wearable device, an individual detector or the first wearable device.

8. A method for providing a simulated environment, comprising:
    outputting, by a first wearable device comprising a display, a first scenario of the simulated environment provided by a processor for a first user; and
    outputting, by a second wearable device comprising a display, a second scenario of the simulated environment provided by the processor for a second user;
    wherein when a second coordinate of the second user in the simulated environment is detectable in a predetermined distance distanced from a first coordinate of the first user in the simulated environment, providing, by the processor, an indication corresponding to the second user in the first scenario; and
    refreshing, by the processor, the indication according to a motion of the second user in the first scenario,
    wherein the indication is an avatar corresponding to the second user, and the method further comprising:
    refreshing, by the processor, the avatar corresponding to the motion of the second user in the first scenario when the motion is being detected exceeding a motion threshold; and
    reducing, by the processor, a refresh rate for refreshing the avatar corresponding to the motion when the motion is being detected lowering the motion threshold.

9. The method of claim 8, further comprising:
    stopping, by the processor, to illustrate the avatar in the first scenario when the second coordinate of the second user in the simulated environment is no longer detectable in the predetermined distance distanced from the first coordinate of the first user in the simulated environment.

10. The method of claim 8, further comprising:
    stopping, by the processor, to refresh the avatar in the first scenario when the second coordinate of the second user in the simulated environment is no longer detectable in the predetermined distance distanced from the first coordinate of the first user in the simulated environment.

11. The method of claim 8, wherein the motion threshold is determined according to height, length of arm, length of feet or step length of the second user.

12. The method of claim 8, wherein the predetermined distance is determined according to height, length of arm, length of feet or step length measured from a user who carries the first wearable device.

13. The method of claim 8, wherein the indication is a token corresponding to the second user.

14. The method of claim 8, wherein a distance between the second coordinate of the second user in the simulated environment and the first coordinate of the first user in the simulated environment is detected by the second wearable device, an individual detector or the first wearable device.

* * * * *